US008581890B2

(12) United States Patent
Chen et al.

(10) Patent No.: US 8,581,890 B2
(45) Date of Patent: Nov. 12, 2013

(54) LIQUID CRYSTAL DISPLAY, FLAT DISPLAY AND GATE DRIVING METHOD THEREOF

(75) Inventors: Yung-Chih Chen, Hsin-Chu (TW); Tsung-Ting Tsai, Hsin-Chu (TW); Kuo-Chang Su, Hsin-Chu (TW); Chun-Hsin Liu, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 326 days.

(21) Appl. No.: 12/684,905

(22) Filed: Jan. 9, 2010

(65) Prior Publication Data

US 2011/0169793 A1 Jul. 14, 2011

(30) Foreign Application Priority Data

Sep. 14, 2009 (TW) .............................. 98130969 A

(51) Int. Cl.
*G06F 3/038* (2013.01)

(52) U.S. Cl.
USPC ................ 345/205; 345/204; 345/30; 345/87

(58) Field of Classification Search
USPC ................................... 345/204–215, 30–111
See application file for complete search history.

(56) References Cited

U.S. PATENT DOCUMENTS 6,075,505 A * 6/2000 Shiba et al. .................... 345/87
7,365,713 B2 4/2008 Kimura
7,796,108 B2 * 9/2010 Hirakata ........................ 345/96
7,868,861 B2 * 1/2011 Cho et al. ........................ 345/87
7,982,219 B2 * 7/2011 Kuo et al. ....................... 257/59
8,085,232 B2 * 12/2011 Joo et al. ......................... 345/96
8,115,714 B2 * 2/2012 Murai et al. .................... 345/88
8,179,350 B2 * 5/2012 Park et al. ....................... 345/92
2001/0015715 A1 * 8/2001 Hebiguchi et al. .............. 345/92
2003/0058229 A1 * 3/2003 Kawabe et al. ............... 345/204
2007/0109250 A1 * 5/2007 Woo ............................. 345/100
2007/0139356 A1 * 6/2007 Lee et al. ...................... 345/103
2007/0216634 A1 * 9/2007 Kim et al. ..................... 345/100

FOREIGN PATENT DOCUMENTS

CN 1746959 A 3/2006

* cited by examiner

*Primary Examiner* — Christopher E Leiby
(74) *Attorney, Agent, or Firm* — WPAT, PC; Justin King

(57) ABSTRACT

In a liquid crystal display, a flat display and a gate driving method thereof, the flat display comprises first and second pixel rows, first to third gate lines and a gate driving circuit. The first gate line is for determining whether to turn on a portion of pixels in the first pixel row, the second gate line is for determining whether to turn on another portion of pixels in the first pixel row, and the third gate line is for determining whether to turn on a portion of the pixels in the second pixel row. The gate driving circuit is for providing first to third gate driving pulses to the first to third gate lines. The first and second gate driving pulses do not overlap with each other, and the third gate driving pulse partially overlaps with one of the first and second gate driving pulses.

13 Claims, 9 Drawing Sheets

LIQUID CRYSTAL DISPLAY, FLAT DISPLAY AND GATE DRIVING METHOD THEREOF

CROSS-REFERENCE TO RELATED APPLICATIONS

This application is based upon and claims the benefit of priority from the prior Taiwanese Patent Application No. 098130969, filed Sep. 14, 2009, the entire contents of which are incorporated herein by reference.

BACKGROUND

1. Field of the Invention

The present invention relates to the display field, and more particularly to a liquid crystal display (LCD), a flat display and a gate driving method thereof.

2. Description of the Related Art

For reducing costs of display panels, many technologies are developed for saving peripheral ICs (integrated circuits) of the panels, wherein a HSD (half source driver) technology is widely applied. FIG. 1 is a schematic view of a panel cooperating with the HSD technology. As shown in FIG. 1, the panel includes a plurality of gate lines (such as, those indicated by labels G1~Gm), a plurality of source lines (such as, those indicated by labels S1~Sn), a plurality of transistors 102 and a plurality of pixels 104. m and n are both natural numbers. From a mode of coupling pixels as shown in FIG. 1 it can be seen that, the pixels in the same row are coupled to two different gate lines respectively.

FIG. 2 is a time sequence chart of conventional gate driving pulses which are adapted into the panel as shown in FIG. 1. Referring to FIG. 2, each of the gate driving pulses (such as those indicated by a label 202) is configured for turning on the corresponding pixels, thus the turned-on pixels are charged to load corresponding data voltages therein for displaying a desired image. However, since displays are developed for obtaining a high resolution and a high image quality, a width of the gate driving pulses must be shortened correspondingly for being gradually compressed to be a period for charging the pixels. Thus the conventional driving technology as shown in FIG. 2 is poor for charging the pixels. Therefore a pre-charge driving technology is developed, which is shown in FIG. 3.

FIG. 3 is another time sequence chart of conventional gate driving pulses. Referring to FIG. 3, the pre-charge driving technology increases the width of the gate driving pulses, and make two adjacent gate driving pulses partially overlap. Since the width thereof is increased, the novel driving technology has a better capability for charging the pixels than the above conventional driving technology. However, the novel driving technology will make two adjacent pixels in the same pixel row have different luminance, thus it will degrade the quality of the display images, which will be described in FIG. 4.

FIG. 4 is a schematic view for describing faults of the technology as shown in FIG. 3. Gate lines Gk and Gk+1, source lines Sj and Sj+1, transistors 406 and 416, and pixels 408 and 414 are shown in FIG. 4. k and j are both natural numbers. In addition, parasitic capacitances 410, 412, 418 and 420 are also shown in FIG. 4. Labels 402 and 404 represent gate driving pulses provided to the gate lines Gk and Gk+1 respectively. As shown in FIG. 4, In an enable period of the gate driving pulse 402, the gate driving pulse 404 is transmitted to the gate line Gk+1 for turning on the pixel 414. When the pixels 408 and 414 are turned on, the two pixels are loaded corresponding data voltages respectively. However, the data voltage loaded in the pixel 408 is influenced by the coupling effect of the parasitic capacitances, and the data voltage loaded in the pixel 414 is also influenced by the coupling effect of the parasitic capacitances, which will be described in detail in following.

When the enable period of the gate driving pulse 402 is ended, the electric potential of the gate line Gk is transferred from a high potential to a low potential, thus the gate line Gk pulls down the data voltage loaded in the pixel 408 by the coupling effect of the parasitic capacitance 410. Then the enable period of the gate driving pulse 404 is ended subsequently, the electric potential of the gate line Gk+1 is transferred from the high potential to the low potential, thus the gate line Gk+1 pulls down the data voltage loaded in the pixel 414 by the coupling effect of the parasitic capacitance 420, and the gate line Gk+1 also pulls down the data voltage loaded in the pixel 408 again by the coupling effect of the parasitic capacitance 412. Therefore when displaying an image, the numbers of pulling down the data voltages loaded in the pixels 408 and 414 are different, thus the luminance of the two pixels are different.

BRIEF SUMMARY

The present invention relates to a flat display, which does not need to shorten a width of gate driving pulses adapted therein, and variation in influences on luminance of pixels is reduced.

The present invention also relates to a gate driving method, which does not need to shorten a width of gate driving pulses adapted into a flat display, and variation in influences on luminance of pixels of the flat display is reduced.

A flat display in accordance with an exemplary embodiment of the present invention comprises a first pixel row and a second pixel row disposed adjacent to each other, a first gate line and a gate line disposed adjacent to each other, a third gate line and a gate driving circuit. Each of the first pixel row and the second pixel row comprises a plurality of pixels. The first pixel row is disposed between the first gate line and the second gate line, and the first gate line is configured for determining whether to turn on a portion of the pixels in the first pixel row, and the second gate line is configured for determining whether to turn on another portion of the pixels in the first pixel row. The third gate line is disposed adjacent to the second gate line such that the second gate line is disposed between the first gate line and the third gate line, and the third gate line is configured for determining whether to turn on a portion of the pixels in the second pixel row. The gate driving circuit is configured for providing a first gate driving pulse, a second gate driving pulse and a third gate driving pulse to the first gate line, the second gate line and the third gate line. The first gate driving pulse and the second gate driving pulse do not overlap with each other, a rising edge of the third gate driving pulse is generated between a rising edge of the first gate driving pulse and a rising edge of the second gate driving pulse, and a falling edge of the third gate driving pulse is generated between a falling edge of the first gate driving pulse and a falling edge of the second gate driving pulse.

A gate driving method in accordance with another exemplary embodiment of the present invention is adapted into a flat display having a half source driver (HSD) framework. The flat display comprises a first pixel row and a second pixel row disposed adjacent to each other, a first gate line and a second gate line disposed adjacent to each other, a third gate line. Each of the first pixel row and the second pixel row comprises a plurality of pixels. The first pixel row is disposed between the first gate line and the second gate line, the first gate line is configured for determining whether to turn on a portion of the pixels in the first pixel row, and the second gate line is configured for determining whether to turn on another portion of the pixels in the first pixel row. The third gate line is disposed adjacent to the second gate line such that the second gate line is disposed between the first gate line and the third gate line, and the third gate line is configured for determining whether to turn on a portion of the pixels in the second pixel row. The gate driving method comprises: generating a first gate driving pulse, a second gate driving pulse and a third gate driving pulse; providing the first gate driving pulse, the second gate driving pulse and the third gate driving pulse to the first gate line, the second gate line and the third gate line. The first gate driving pulse and the second gate driving pulse do not overlap with each other, a rising edge of the third gate driving pulse is generated between a rising edge of the first gate driving pulse and a rising edge of the second gate driving pulse, and a falling edge of the third gate driving pulse is generated between a falling edge of the first gate driving pulse and a falling edge of the second gate driving pulse.

In an exemplary embodiment of the present invention, the flat display may be a liquid crystal display.

In another exemplary embodiment of the present invention, the third gate driving pulse partially overlaps with one of the first gate driving pulse and the second gate driving pulse.

The present invention separates turning-on periods of the pixels coupled to the different gate lines in a same pixel row, such that numbers of pulling down data voltages loaded in the pixels are same. Therefore, the present invention does not need to shorten a width of the gate driving pulses applied into the flat display, and nearly influences luminance of the pixels.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present liquid crystal display, the present flat display and the present gate driving method thereof in detail. The following description is given by way of example, and not limitation.

Figure 1:
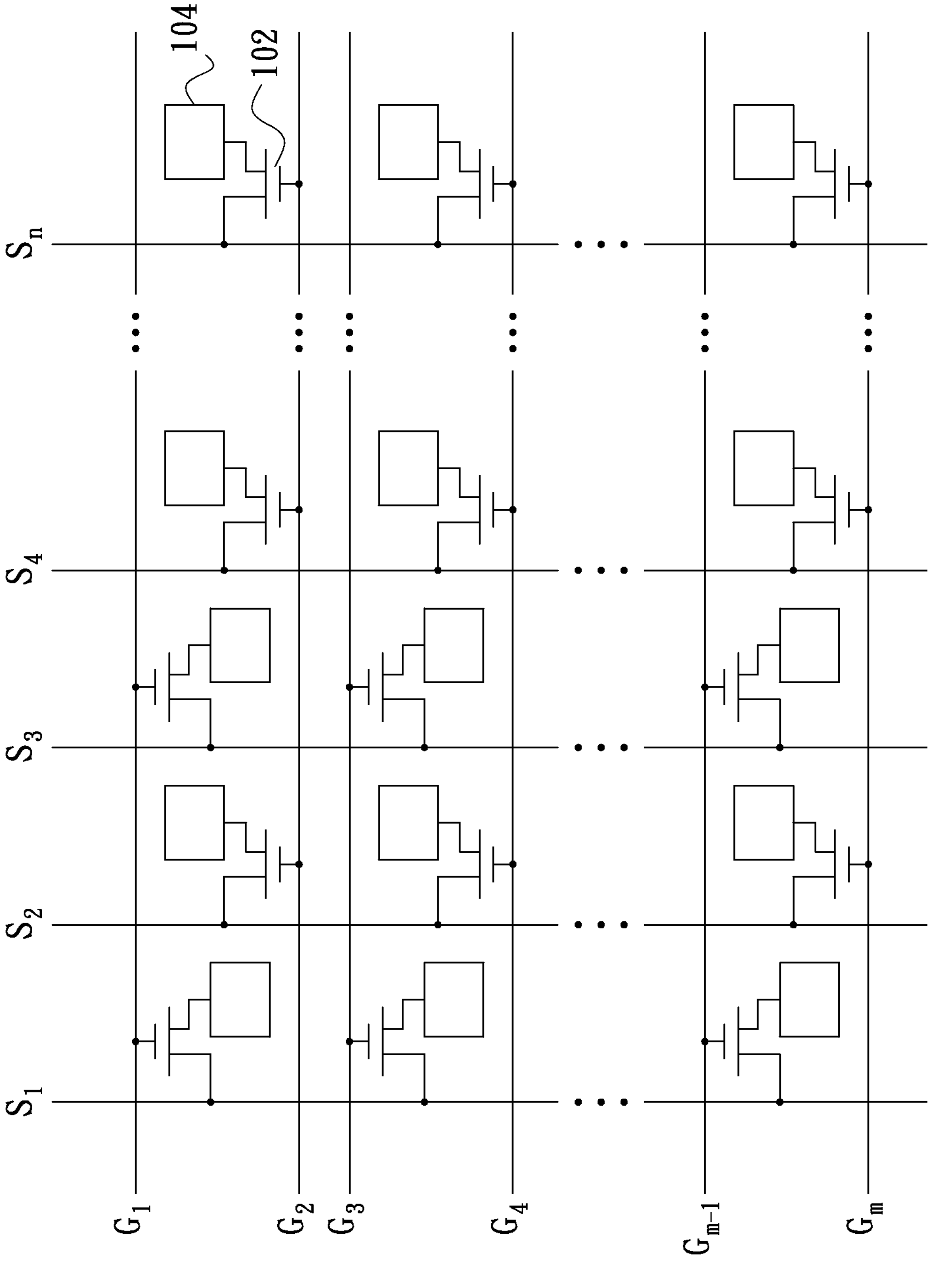
FIG. 1 (Related Art)
FIG. 1 is a schematic view of a panel with HSD technology.
Figure 2:
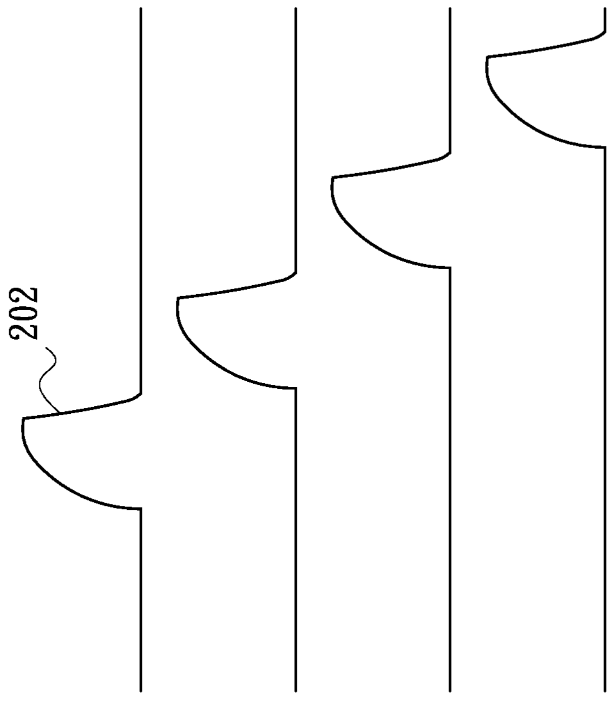
FIG. 2 (Related Art)
FIG. 2 is a time sequence chart of conventional gate driving pulses.
Figure 3:
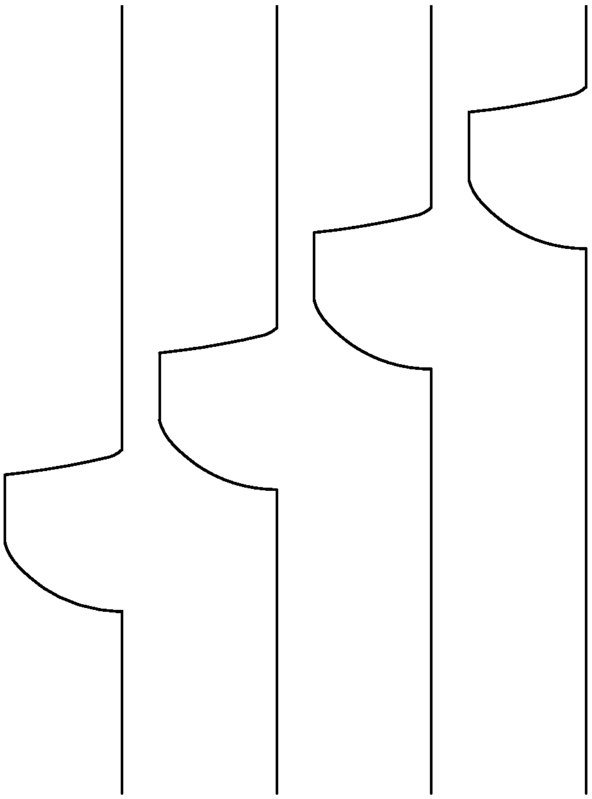
FIG. 3 (Related Art)
FIG. 3 is another time sequence chart of conventional gate driving pulses.
Figure 4:
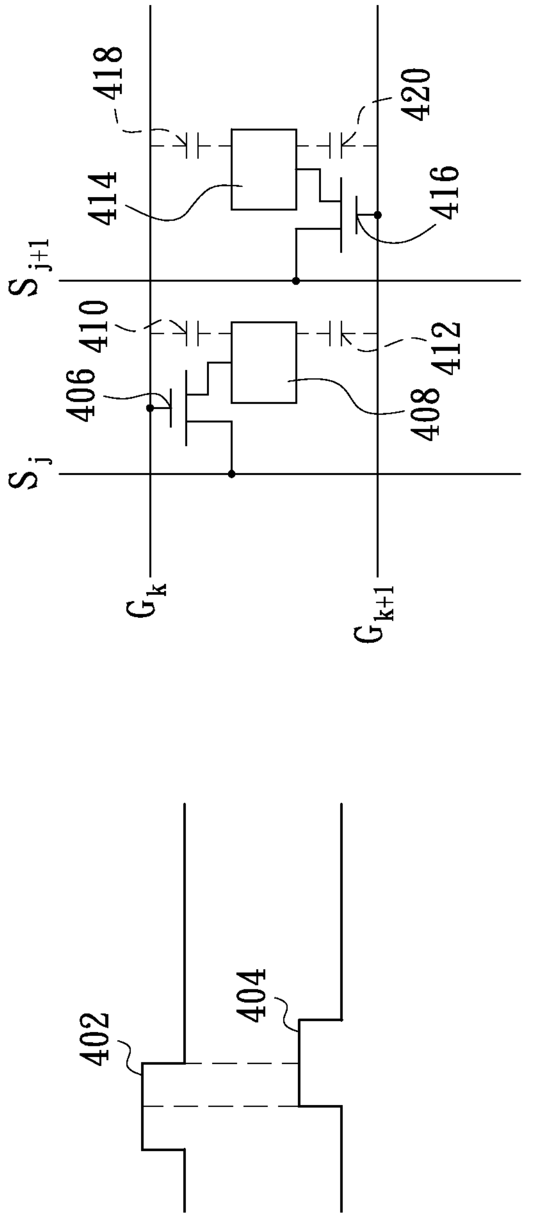
FIG. 4 (Related Art)
FIG. 4 is a schematic view for describing disadvantages of a technology in FIG. 3.
Figure 5:
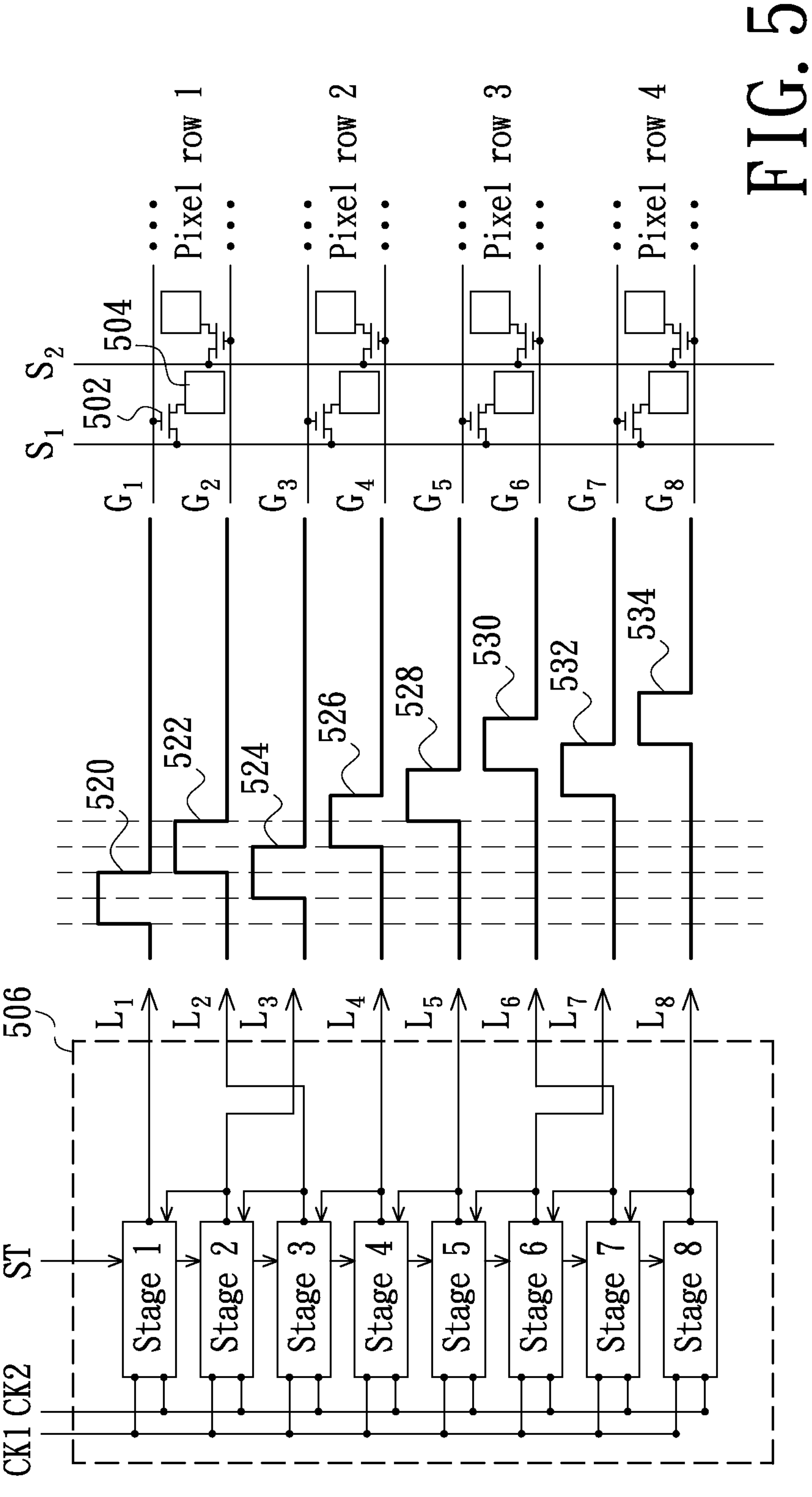
FIG. 5 is a schematic view of a flat display in accordance with an exemplary embodiment of the present invention.

An exemplary embodiment of the present invention employs a novel gate driving circuit to operate, which is described in FIG. 5. FIG. 5 is a schematic view of a flat display in accordance with an exemplary embodiment of the present invention. In this exemplary embodiment, the flat display may be a liquid crystal display. The flat display includes a plurality of gate lines (such as, those indicated by labels G1~G8), a plurality of source lines (such as, those indicated by labels S1~S2), a plurality of transistors 502, a plurality of pixels 504 and a gate driving circuit 506. A mode for coupling the gate lines, the source lines, the transistors and the pixels is same to that as shown in FIG. 1. As shown in FIG. 5, the gate lines G1 and G2 are coupled to pixels in a pixel row 1, the gate lines G3 and G4 are coupled to pixels in a pixel row 2, the gate lines G5 and G6 are coupled to pixels in a pixel row 3, and the gate lines G7 and G8 are coupled to pixels in a pixel row 4. From this it can be seen that these pixel rows are disposed adjacent to each other, and the pixels in the same row are coupled to two different gate lines respectively.

The gate driving circuit 506 is configured for generating gate driving pulses 520~534 according to a start pulse ST, clock signals CK1 and CK2, and providing the generated gate driving pulses 520~534 to the gate lines G1~G8 respectively. In this exemplary embodiment, the gate driving circuit 506 is a gate driver on array (GOA) circuit. Alternatively, the gate driving circuit 506 also may be a gate driver IC. From a time sequence of the gate driving pulses as shown in FIG. 5 it can be seen that, the gate driving pulses 520 and 522 do not overlap with each other, the gate driving pulses 524 and 526 do not overlap with each other, the gate driving pulses 528 and 530 do not overlap with each other, and the gate driving pulses 532 and 534 do not overlap with each other. In other words, turning-on periods of the pixels coupled to the different gate lines in the same pixel row, are separated from each other. Thus, a width of the gate driving pluses adapted into the flat display does not need to be shortened. Advantages thereof will be described in FIG. 6.

Figure 6:
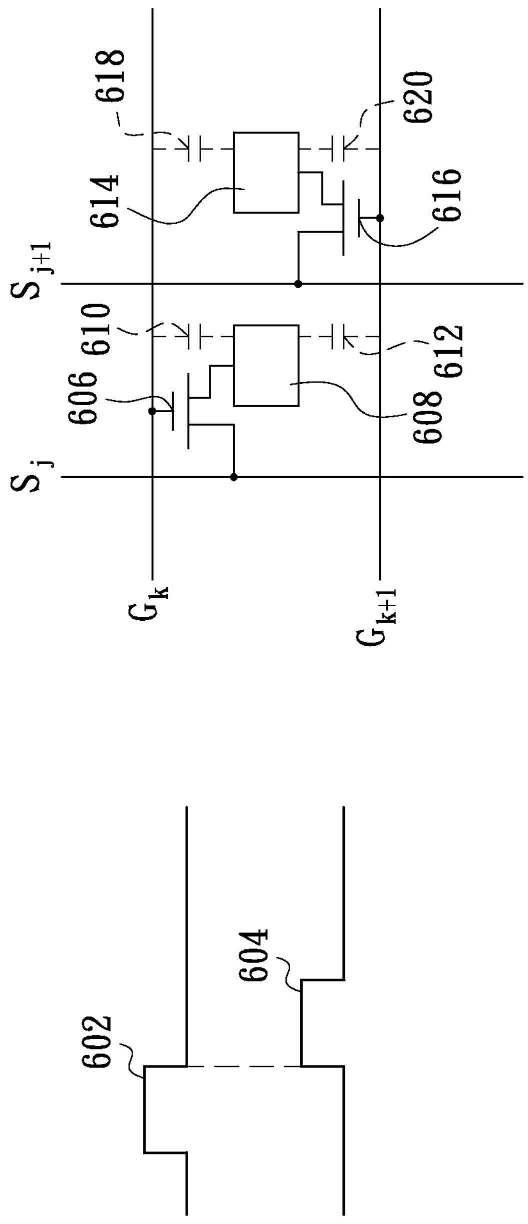
FIG. 6 is a schematic view for describing advantages of a technology in FIG. 5.

FIG. 6 is a schematic view for describing the advantages of the above technology of FIG. 5. Gate lines Gk and Gk+1, source lines Sj and Sj+1, transistors 606 and 616, pixels 608 and 614 are shown in FIG. 6. k and j are both natural numbers. In addition, parasitic capacitances 610, 612, 618 and 620 are also shown in FIG. 6. Labels 602 and 604 represent gate driving pulses provided to the gate lines Gk and Gk+1. As shown in FIG. 6, when an enable period of the gate driving pulse 602 is ended, the gate driving pulse 604 starts to be transmitted to the gate line Gk+1. Therefore, for the pixel 608, a data voltage loaded therein is pulled down once only when the enable period of the gate driving pulse 602 is ended. For the pixel 614, a data voltage loaded therein is pulled down once only when the enable period of the gate driving pulse 604 is ended. It can be seen that, when displaying a same image, the data voltages loaded in the pixels 608 and 614 are pulled down once, thus variation in influences on luminance of the two pixels is reduced. That is, the above operation can make the luminance of the pixels of the flat display uniform, and can obtain an excellent image quality.

Referring to FIG. 5 again, the following will describe how the gate driving circuit 506 generates the gate driving pulses 520~534. As shown in FIG. 5, the gate driving circuit 506 includes a plurality of output lines (such as, those indicated by labels L1~L8) and a plurality of stages of cascade coupling (such as, those indicated by stage 1~stage 8). The stages may be conventional shift registers. One terminal of each of the output lines L1~L8 is electrically coupled to the gate lines G1~G8 respectively. Specifically, another terminal of the output line L2 is electrically coupled to a gate driving pulse output terminal of the stage 3, another terminal of the output line L3 is electrically coupled to a gate driving pulse output terminal of the stage 2, another terminal of the output line L6 is electrically coupled to a gate driving pulse output terminal of the stage 7, and another terminal of the output line L7 is electrically coupled to a gate driving pulse output terminal of the stage 6. That is, the output line L2 is over the output line L3, and the output line L6 is over the output line L7.

Since the gate driving pulse generated by the stage i precedes the gate driving pulse generated by the stage i+1 over a half of the enable period (i is one of the natural numbers 1~7), the gate lines coupled to the same pixel row receive the gate driving pulses separately according to the above mode of coupling the output lines. Thus, the turning-on periods of the pixels coupled to the different gate lines in the same pixel row are separated.

It should be noted that, since an rising edge of the gate driving pulse 524 is between rising edges of the gate driving pulses 520 and 522, and an falling edge of the gate driving pulse 524 is between falling edges of the gate driving pulses 520 and 522, the gate driving pulse 524 maybe partially overlaps with the gate driving pulses 520 and 522. In other aspect, the enable period can be too short to overlap the gate driving pulse 524 with either the gate driving pulses 520 or 522. Similarly, the gate driving pulses 522, 524 and 526 are similar. In addition, from the mode of coupling the output lines it can be seen that, the time sequence of the gate driving pulses 520~534 alters by regarding every four gate driving pulses as a cycle. Thus, the overlap mode of the gate driving pulses 528~534 is same to that of the gate driving pulses 520~526.

From the first exemplary embodiment it can be seen that, a sequence of the gate lines G1~G8 receiving the gate driving pulses can be altered by altering the mode of coupling the output lines L1~L8. Similarly, the flat display as shown in FIG. 5 also can employ a conventional gate driving circuit, and can only alter the coupling mode of traces between the gate driving circuit and the gate lines G1~G8 to further alter the sequence of the gate lines G1~G8 receiving the gate driving pulses.

Figure 7:
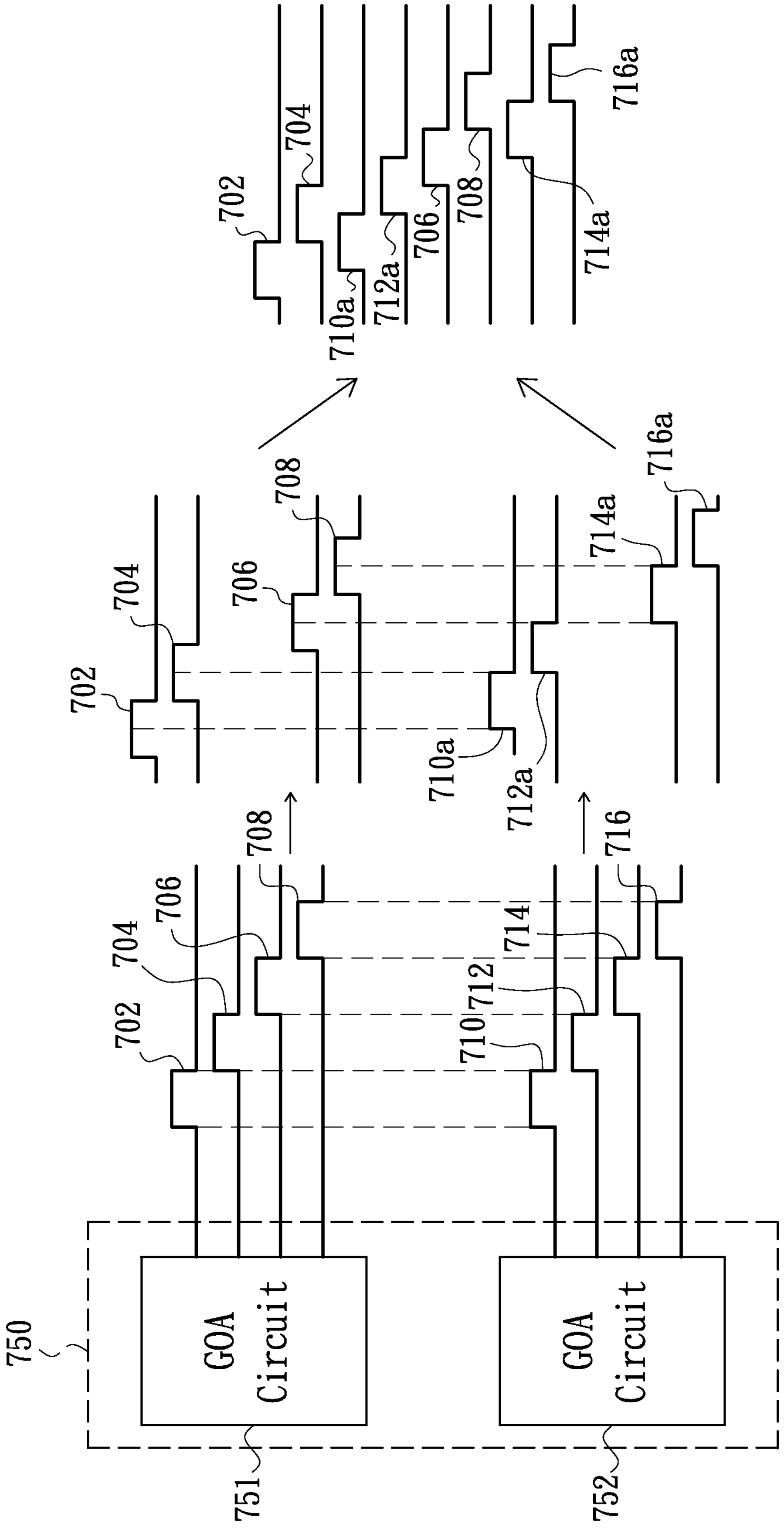
FIG. 7 is a schematic view of employing two conventional GOA circuits to operate.

Another exemplary embodiment employs two conventional GOA circuits to operate, which is described in FIG. 7. FIG. 7 is a schematic view of employing the two conventional GOA circuits to operate. As shown in FIG. 7, a label 750 represents a gate driving circuit, and the gate driving circuit 750 includes GOA circuits 751 and 752. Of course, the gate driving circuit 750 also can employ two gate driver ICs. Each of the GOA circuits 751 and 752 is configured for generating four gate driving pulses (such as, those indicated by labels 702~716) without overlapping with each other, and time sequences of the gate driving pulses generated by the GOA circuits 751 and 752 are same. Then the gate driving pulses 710~716 are delayed for a half of the enable period (such as, those indicated by labels 710*a*~716*a*), the gate driving pulses 702~708 and 710*a*~716*a* are divided into four groups in sequence, and each group has two gate driving pulses. Afterwards, the second group (that is, the gate driving pulses 706 and 708) and the third group (that is, the gate driving pulses 710*a* and 712*a*) are swapped to form the gate driving pulses as shown in FIG. 5.

In this exemplary embodiment, a method of swapping the second group and the third group may be altering a coupling mode of traces as described in the second exemplary embodiment.

From the third exemplary embodiment it can be seen that, various operations as described in FIG. 7 also can be integrated into the gate driving circuit 750, which can be performed by increasing some suitable circuits in the gate driving circuit 750.

Figure 8:
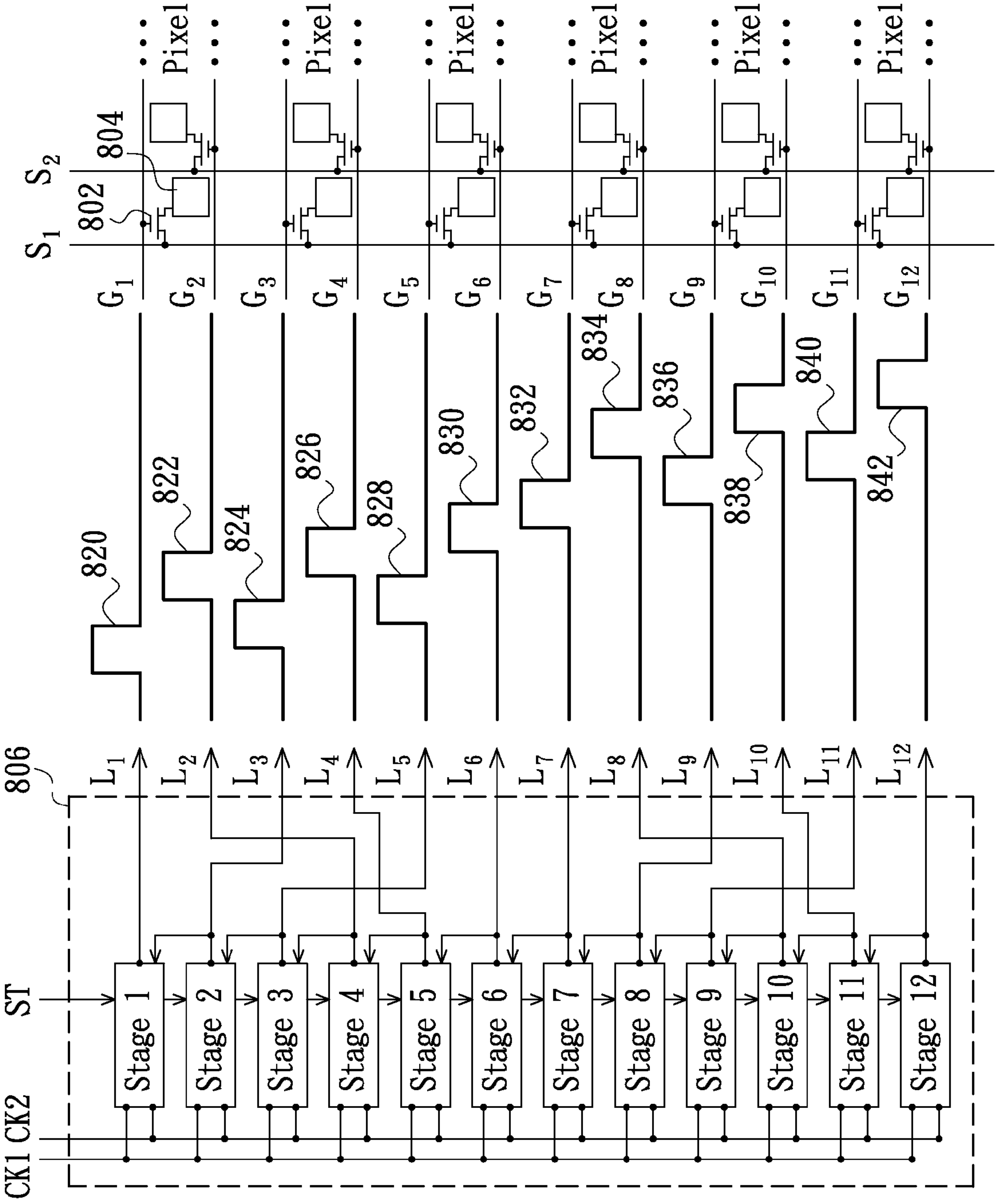
FIG. 8 is a schematic view of a flat display in accordance with another exemplary embodiment of the present invention.

Other exemplary embodiment is an expansion of the first exemplary embodiment, which is shown in FIG. 8. FIG. 8 is a schematic view of a flat display in accordance with another exemplary embodiment of the present invention. In this exemplary embodiment, the flat display may be a liquid crystal display, and also may be an electrophoretic display (EPD) or an other-type display. The flat display includes a plurality of gate lines (such as, those indicated by labels G1~G12), a plurality of source lines (such as, those indicated by labels S1~S2), a plurality of transistors 802, a plurality of pixels 804 and a gate driving circuit 806. The gate driving circuit 806 includes a plurality of output lines (such as, those indicated by labels L1~L12) and a plurality of stages (such as, those indicated by stage 1~stage 12) of cascade coupling. The gate driving circuit 806 is configured for outputting gate driving pulses 820~842. From a coupling mode of the output lines L1~L12 it can be seen that, this exemplary embodiment is similar with the first exemplary embodiment, except that the time sequence of the gate driving pulses 820~842 of the exemplary embodiment alters by employing every six gate driving pulses as a cycle. Thus, an overlapping mode of the gate driving pulses 832~842 is same to that of the gate driving pulses 820~830.

Figure 9:
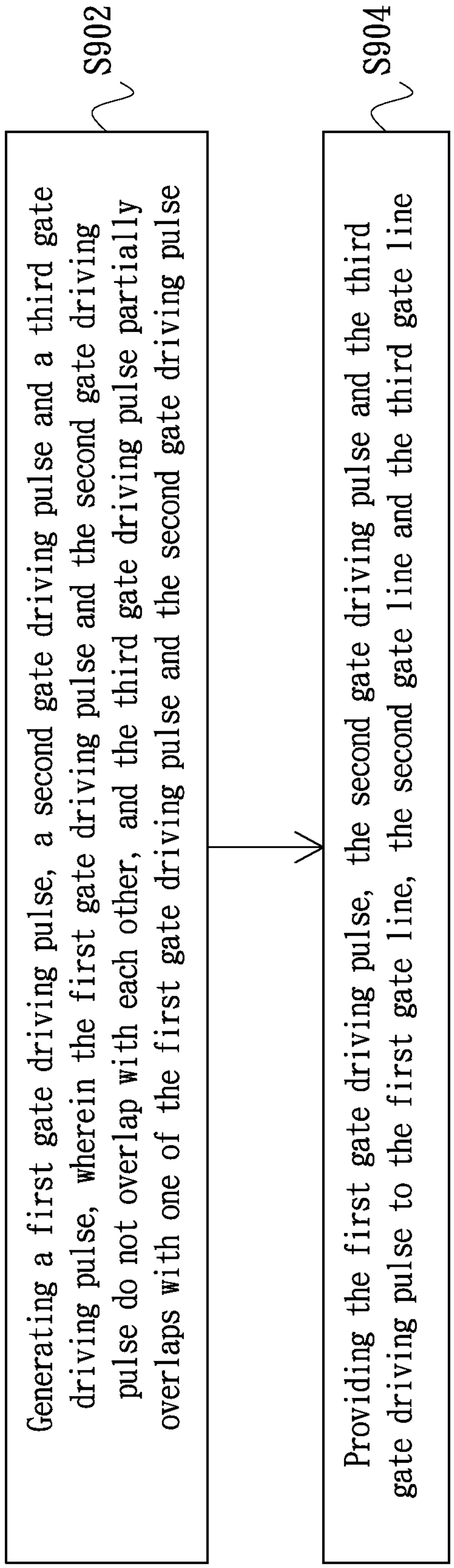
FIG. 9 is flow chart of a gate driving method in accordance with an exemplary embodiment of the present invention.

From the above exemplary embodiments, a basal operation can be concluded, which is shown in FIG. 9. FIG. 9 is a flow chart of a gate driving method in accordance with an exemplary embodiment of the present invention, and the gate driving method is adapted into the flat display having a half source driver (HSD) framework. The flat display includes a first pixel row and a second pixel row disposed adjacent to each other, a first gate line and a second gate line disposed adjacent to each other, a third gate line. Each of the first pixel row and the second pixel row has a plurality of pixels. The first pixel row is disposed between the first gate line and the second gate line. The first gate line is configured for determining whether to turn on a portion of the pixels in the first pixel row, and the second gate line is configured for determining whether to turn on another portion of the pixels in the first pixel row. The third gate line is disposed adjacent to the second gate line such that the second gate line is between the first gate line and the third gate line, and the third gate line is configured for determining whether to turn on a portion of the pixels of the second pixel row. The gate driving method includes following steps. Firstly, a first gate driving pulse, a second gate driving pulse and a third gate driving pulse are generated, wherein the first gate driving pulse and the second gate driving pulse do not overlap with each other, and the third gate driving pulse maybe partially overlaps with one of the first gate driving pulse and the second gate driving pulse (as shown in a step S902). Then, the first gate driving pulse, the second gate driving pulse and the third gate driving pulse are provided to the first gate line, the second gate line and the third gate line respectively (as shown in a step S904).

In summary, the present invention separates the turning-on periods of the pixels coupled to the different gate lines in the same pixel row, thus the numbers of pulling down the data voltages loaded in the pixels are same. Therefore, the width of the gate driving pulses applied into the flat display does not need to be shortened, and the luminance of the pixels is influenced nearly. It should be noted that, although the above exemplary embodiments employ the liquid crystal display to describe the present invention, the driving method of the present invention also can be applied into organic light-emitting display, electrophoretic display, flexible display or touch-screen active matrix display with touch function, etc. The driving method can separate the turning-on periods of the pixels coupled to the different data lines in the same pixel row, thus can improve the image quality thereof.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flat display, comprising:

a first pixel row and a second pixel row disposed adjacent to each other, wherein the first pixel row comprises a first pixel and a second pixel, and the second pixel row comprises a third pixel and a fourth pixel;

a first gate line and a second gate line disposed adjacent to each other, wherein the first pixel row is disposed between the first gate line and the second gate line, the first gate line is electrically coupled to the first pixel in the first pixel row, and the second gate line is electrically coupled to the second pixel in the first pixel row;

a third gate line and a fourth gate line disposed adjacent to each other, wherein the third gate line is electrically coupled to the third pixel in the second pixel row, the fourth gate line is electrically coupled to the fourth pixel in the second pixel row, and the second gate line is disposed between the first gate line and the third gate line; and a gate driving circuit comprising sequentially a first stage, a second stage, a third stage and a fourth stage of cascade coupling, wherein the first stage has a first output line connecting to the first gate line, the second stage has a second output line connecting to the third gate line, the third stage has a third output line connecting to the second gate line, and the fourth stage has a fourth output line connecting to the fourth gate line, wherein the first stage generates a first gate driving pulse during a first time slot and a second time slot, the second stage generates a third gate driving pulse during the second time slot and a third time slot, the third stage generates a second gate driving pulse during the third time slot and a fourth time slot, the fourth stage generates a fourth gate driving pulse during the fourth time slot and a fifth time slot, and the first time slot, the second time slot, the third time slot, the fourth time slot and the fifth time slot are sequential and consecutive.

2. The flat display as claimed in claim 1, wherein the gate driving circuit is a gate driver on array (GOA) circuit.

3. The flat display as claimed in claim 1, wherein the third stage is the nearest next stage of the second stage.

4. The flat display as claimed in claim 1, wherein the second stage is the nearest next stage of the first stage.

5. The flat display as claimed in claim 1, wherein the third gate driving pulse is partially overlaps with both of the first gate driving pulse and the second gate driving pulse.

6. The flat display as claimed in claim 1, wherein the gate driving circuit is a gate driver IC.

7. The flat display as claimed in claim 1, wherein the flat display comprises a liquid crystal display, an organic light-emitting display, an electrophoretic display, a flexible display or a touch-screen active matrix display.

8. A gate driving method adapted into a flat display having a half source driver (HSD) framework, the flat display comprising:

a first pixel row and a second pixel row disposed adjacent to each other, wherein the first pixel row comprises a first pixel and a second pixel, and the second pixel row comprises a third pixel and a fourth pixel;

a first gate line and a second gate line disposed adjacent to each other, wherein the first pixel row is disposed between the first gate line and the second gate line, the first gate line is electrically coupled to the first pixel in the first pixel row, and the second gate line is electrically coupled to the second pixel in the first pixel row;

a third gate line and a fourth gate line disposed adjacent to each other, wherein the third gate line is electrically coupled to the third pixel in the second pixel row, the fourth gate line is electrically coupled to the fourth pixel in the second pixel row; and a gate driving circuit comprising sequentially a first stage, a second stage, a third stage and a fourth stage of cascade coupling, wherein the first stage has a first output line connecting to the first gate line, the second stage has a second output line connecting to the third gate line, the third stage has a third output line connecting to the second gate line, and the fourth stage has a fourth output line connecting to the fourth gate line;

the gate driving method comprising:

generating a first gate driving pulse during a first time slot and a second time slot by the first stage, a third gate driving pulse during the second time slot and a third time slot by the second stage, a second gate driving pulse during the third time slot and a fourth time slot by the third stage, a fourth gate driving pulse during the fourth time slot and a fifth time slot by the fourth stage, wherein the first time slot, the second time slot, the third time slot, the fourth time slot and the fifth time slot are sequential and consecutive; and providing the first gate driving pulse, the second gate driving pulse, and the third gate driving pulse and the fourth gate driving pulse to the first gate line, the second gate line, the third gate line and the fourth gate line respectively.

9. The gate driving method as claimed in claim 8, wherein the third gate driving pulse is partially overlaps with both of the first gate driving pulse and the second gate driving pulse.

10. The gate driving method as claimed in claim 8, wherein the first gate driving pulse, the second gate driving pulse, the third gate driving pulse and the fourth gate driving pulse are generated by a same gate driver on array (GOA) circuit.

11. The gate driving method as claimed in claim 8, wherein the first gate driving pulse, the second gate driving pulse, the third gate driving pulse and the fourth gate driving pulse are generated by a same gate driver IC.

12. A gate driving method adapted into a flat display having a half source driver (HSD) framework, the flat display comprising:

a first pixel row and a second pixel row disposed adjacent to each other, wherein the first pixel row comprises a first pixel and a second pixel, and the second pixel row comprises a third pixel and a fourth pixel;

a first gate line and a second gate line disposed adjacent to each other, wherein the first pixel row is disposed between the first gate line and the second gate line, the first gate line is electrically coupled to the first pixel in the first pixel row, and the second gate line is electrically coupled to the second pixel in the first pixel row;

a third gate line and a fourth gate line disposed adjacent to each other, wherein the third gate line is electrically coupled to the third pixel in the second pixel row, the fourth gate line is electrically coupled to the fourth pixel in the second pixel row, and the second gate line is disposed between the first gate line and the third gate line; and a gate driving circuit comprising a first circuit and a second circuit, each of the first and second circuits being one of a gate driver on array circuit and a gate driver IC; the gate driving method comprising:

synchronously generating a first group of gate driving pulses and a second group of gate driving pulses respectively by the first circuit and the second circuit, the second group of gate driving pulses having a same time sequence as the first group of gate driving pulses, the first group of gate driving pulses being without overlapping with each other, and the second group of gate driving pulses being without overlapping with each other;

entirely delaying the second group of gate driving pulses with a predetermined time period; and selecting two adjacent gate driving pulses from the first group of gate driving pulses as a first gate driving pulse and a second gate driving pulse respectively to the first gate line and the second gate line, and selecting two adjacent gate driving pulses from the entirely-delayed second group of gate driving pulses as a third gate driving pulse and a fourth gate driving pulse respectively to the third gate line and the fourth gate line, wherein the first gate driving pulse is located during a first time slot and a second time slot, the third gate driving pulse is located during the second time slot and a third time slot, the second gate driving pulse is located during the third time slot and a fourth time slot, and the fourth gate driving pulse is located during the fourth time slot and a fifth time slot, the first time slot, the second time slot, the third time slot, the fourth time slot and the fifth time slot are sequential and consecutive.

13. The gate driving method as claimed in claim 12, wherein the predetermined time period is substantially equal to a half of an enable period of any one of the first group of gate driving pulses.

* * * * *